United States Patent [19]

Yoo et al.

[11] Patent Number: 4,957,892

[45] Date of Patent: * Sep. 18, 1990

[54] PROCESS FOR COMBUSTING SOLID SULFUR CONTAINING MATERIAL

[75] Inventors: Jin S. Yoo, Flossmoor; John A. Jaecker, Homewood, both of Ill.

[73] Assignee: UOP, Des Plaines, Ill.

[ * ] Notice: The portion of the term of this patent subsequent to Jan. 22, 2002 has been disclaimed.

[21] Appl. No.: 178,629

[22] Filed: Apr. 7, 1988

Related U.S. Application Data

[60] Division of Ser. No. 940,619, Dec. 11, 1986, Pat. No. 4,758,418, which is a division of Ser. No. 692,448, Jan. 16, 1985, Pat. No. 4,642,178, which is a division of Ser. No. 494,604, May 16, 1983, Pat. No. 4,995,304, which is a continuation-in-part of Ser. No. 301,678, Sep. 14, 1981, abandoned, which is a continuation-in-part of Ser. No. 173,315, Jul. 29, 1980, abandoned.

[51] Int. Cl.$^5$ .................................................. B01J 29/00
[52] U.S. Cl. .......................................... 502/63; 502/64; 502/65; 502/66; 502/69
[58] Field of Search .................. 502/66, 65, 202, 241, 502/247, 251, 252, 524, 63, 64, 69; 252/244 R

[56] References Cited

U.S. PATENT DOCUMENTS

| | | | |
|---|---|---|---|
| Re. 27,639 | 5/1973 | Thomas et al. | 260/672 T |
| 2,992,191 | 7/1961 | Erickson | 502/524 |
| 3,140,253 | 7/1964 | Plank et al. | 208/120 |
| 3,436,358 | 4/1969 | Taygeson | 502/524 |
| 3,791,992 | 2/1974 | Feldwick | 252/463 |
| 3,823,092 | 7/1974 | Gladrow | 252/455 Z |
| 3,835,031 | 9/1974 | Bertolacini | 208/120 |
| 3,930,987 | 1/1976 | Grand | 208/111 |
| 3,972,837 | 8/1976 | Acres et al. | 502/524 |
| 4,001,375 | 1/1977 | Longo | 423/244 |
| 4,049,582 | 9/1977 | Erickson et al. | 502/524 |
| 4,071,436 | 1/1978 | Blanton et al. | 208/120 |
| 4,153,534 | 5/1979 | Vasalos | 208/120 |
| 4,153,535 | 5/1979 | Vasalos et al. | 208/120 |
| 4,263,020 | 4/1981 | Eberly et al. | 502/524 |
| 4,495,304 | 1/1985 | Yoo et al. | 502/66 |

OTHER PUBLICATIONS

Thrush, Paul W., *A Dictionary of Mining and Related Terms*, U.S. Bureau of Mines, pp. 1054, ©1968.
"Selection of Metal Oxides for Removing $SO_2$ from Flue Gas", Ind. Eng. Chemical Process Design Development, vol. 10, Nov. 3, 1971.
D. W. Deberry et al., "Rates of Reaction of $SO_2$ with Metal Oxides".
Canadian Journal of Chemical Engineering, 49, 781 (1971).
"Modern Aspects of Inorganic Chemistry" by H. I. Emeleus & A. G. Sharpe (1973), pp. 57-58 and 512-513.
"Structural Inorganic Chemistry", 3rd Ed., (1962) by A. F. Wells, pp. 130, 487-490, 503 & 526.
"Advanced Inorganic Chemistry", 3rd Ed., by F. A. Cotton & G. Wilkinson (1972), pp. 54-55.

*Primary Examiner*—Patrick P. Garvin
*Assistant Examiner*—George R. Fourson
*Attorney, Agent, or Firm*—Vincent J. Vasta, Jr.; Thomas K. McBride

[57] ABSTRACT

An improved process for converting hydrocarbons using a catalyst which is periodically regenerated to remove carbonaceous deposits, the catalyst being comprised of a mixture containing, as a major component, solid particles capable of promoting hydrocarbon conversion at hydrocarbon conversion conditions, and, as a minor component, discrete entities comprising at least one spinel, preferably alkaline earth metal-containing spinel; thereby reducing the amount of sulfur oxides exiting the catalyst regeneration zone.

Improved hydrocarbon conversion catalysts are also disclosed.

29 Claims, No Drawings

PROCESS FOR COMBUSTING SOLID SULFUR CONTAINING MATERIAL

This application is a division of prior U.S. application Ser. No. 940,619 filed 12/11/86, now U.S. Pat. No. 4,758,418, which is a division of application Ser. No. 692,448, filed 1/16/85, now U.S. Pat. No. 4,642,178, which is a division of application Ser. No. 494,604, filed 5/16/83, now U.S. Pat. No. 4,495,304, which is a continuation in part of application Ser. No. 301,678, filed 9/14/81, now abandoned, which is a continuation in part of application Ser. No. 173,315, filed 7/29/80, now abandoned.

BACKGROUND OF THE INVENTION

The invention is concerned with the combusting of solid, sulfur-containing, material in a manner to effect a reduction in the emission of sulfur oxides to the atmosphere. In one specific embodiment, the invention involves the catalytic cracking of sulfur-containing hydrocarbin feedstocks in a manner to effect a reduction in the amount of sulfur oxides emitted from the regeneration zone of a hydrocarbon catalytic cracking unit.

Typically, catalytic cracking of hydrocarbons takes place in a reaction zone at hydrocarbon cracking conditions to produce at least one hydrocarbon product and to cause carbonaceous material (coke) to be deposited on the catalyst. Additionally, some sulfur, originally present in the feed hydrocarbons may also be deposited, e.g., as a component of the coke, on the catalyst. It has been reported that approximately 50% of the feed sulfur is converted to $H_2S$ in the FCC reactor, 40% remains in the liquid products and about 4 to 10% is deposited on the catalyst These amounts vary with the types of feed, rate of hydrocarbon recycle, steam stripping rate, the type of catalyst, reactor temperature, etc.

Sulfur-containing coke deposits tend to deactivate cracking catalyst. Cracking catalyst is advantageously continuously regenerated, by combustion with oxygen-containing gas in a regeneration zone, to low coke levels, typically below about 0.4% by weight, to perform satisfactorily when it is recycled to the reactor. In the regeneration zone, at least a portion of sulfur, along with carbon and hydrogen, which is deposited on the catalyst, is oxidized and leaves in the form of sulfur oxides ($SO_2$ and $SO_3$, hereinafter referred to as "SOx") along with substantial amounts of CO, $CO_2$ and $H_2$.

Considerable recent research effort has been directed to the reduction of sulfur oxide emissions from the regeneration zones of hydrocarbon catalytic cracking units. One technique involved circulating one or more metal oxides capable of associating with oxides of sulfur with the cracking catalyst inventory in the regeneration zone. When the particles containing associated oxides of sulfur are circulated to the reducing atmosphere of the cracking zone, the associated sulfur compounds are released as gaseous sulfur-bearing material such as hydrogen sulfide which is discharged with the products from the cracking zone and are in a form which can be readily handled in a typical facility, e.g., petroleum refinery. The metal reactant is regenerated to an active form, and is capable of further associating with the sulfur oxides when cycled to the regeneration zone.

Incorporation of Group II metal oxides on particles of cracking catalyst in such a process has been proposed (U.S. Pat. No. 3,835,031 to Bertolacini). In a related process described in U.S. Pat. No. 4,071,436 to Blanton et al, discrete fluidizable alumina-containing particles are circulated through the cracking and regenerator zones along with physically separate particles of the active zeolitic cracking catalyst. The alumina particles pick up oxides of sulfur in the regenerator, forcing at least one solid compound, including both sulfur and aluminum atoms. The sulfur atoms are released as volatiles, including hydrogen sulfide, in the cracking unit. U.S. Pat. No. 4,071,436 further discloses that 0.1 to 10 weight percent MgO and/or 0.1 to 5 weight percent $Cr_2O_3$ are preferably present in the alumina-containing particles. Chromium is used to promote coke burnoff.

A metallic component, either incorporated into catalyst particles or present on any of a variety of "inert" supports, is exposed alternately to the oxidizing atmosphere of the regeneration zone of an FCCU and the reducing atmosphere of the cracking zone to reduce sulfur oxide emissions from regenerator gases in accordance with the teachings of U.S. Pat. Nos. 4,153,534 and 4,153,535 to Vasalos and Vasalos et al, respectively. In Vasalos et al, a metallic oxidation promoter such as platinum is also present when carbon monoxide emissions are to be reduced. These patents disclose nineteen different metallic components, including materials as diverse as alkaline earths, sodium, heavy metals and rare earth, as being suitable reactants for reducing emissions of oxides of sulfur. The metallic reactants that are especially preferred are sodium, magnesium, manganese and copper. When used as the carrier for the metallic reactant, the supports that are used preferably have a surface area at least 50 square meters per gram. Examples of allegedly "inert" supports are silica, alumina and silica-alumina. The Vasalos and Vasalos et al patents further disclose that when certain metallic reactants (exemplified by oxides of iron, manganese or cerium) are employed to capture oxides of sulfur, such metallic components can be in the form of a finely divided fluidizable powder.

Similarly, a vast number of sorbents have been proposed for desulfurization of non-FCCU flue gases in zones outside the unit in which SOx is generated. In some such non-FCCU applications, the sorbents are regenerated in environments appreciably richer in hydrogen than the cracking zone of an FCC unit. Cerium oxide is one of fifteen adsorbents disclosed for flue gas desulfurization in a publication of Lowell et al, "SELECTION OF METAL OXIDES FOR REMOVING SOx FROM FLUE GAS," Ind. Eng. Chemical Process Design Development, Vol. 10, Nov. 3, 1971. In U.S. Pat. No. 4,001,375 to Longo, cerium on an alumina support is used to absorb $SO_2$ from non-FCCU flue gas streams or automobile exhaust at temperatures of 572° to 1472° F., preferably 932° to 100° F. The sorbent is then regenerated in a separate unit by contacting it with hydrogen mixed with steam at 932° to 1472° F. During regeneration the desorbed species is initially $SO_2$ and $H_2S$ along with/excess reducing gases which can be used as feedstock for a Claus unit. The Longo patent is not concerned with reducing emissions from an FCC unit and the reducing atmosphere employed in practice of this process differs significantly from the hydrocarbon-rich atmosphere in a catalytic cracker. Thus a hydrocarbon cracking reaction zone is preferably operated in the substantial absence of added hydrogen while the presence of sweeping amounts of hydrogen gas is essential to the regeneration step in practice of the process of Longo.

D W. Deberry et al, "RATES OF REACTION OF SO$_2$ WITH METAL OXIDES", Canadian Journal of Chemical Engineering, 49, 781 (1971) reports that cerium oxide was found to form sulfates more rapidly than most of the other oxides tested. The temperatures used, however, were below 900° F. and thus below those preferred for use in catalyst regenerators in FCC units.

Many commercial zeolitic FCC catalyst contain up to 4% rare earth oxide, the rare earth being used to stabilize the zeolite and provide increased activity. See, for example, U.S. Pat. No. 3,930,987 to Grand. The rare earths are most often used as mixtures of La$_2$O$_3$, CeO$_2$, Pr$_6$O$_{11}$, Nd$_2$O$_3$ and others. Some catalyst is produced by using a lanthanum-rich mixture obtained by removing substantial cerium from the mixture of rare earth. It has been found that the mere presence of rare earth in a zeolitic cracking catalyst will not necessarily reduce SOx emissions to an appreciable extent.

In accordance with the teachings of U.S. Pat. No. 3,823,092 to Gladrow, certain zeolitic catalyst compositions capable of being regenerated at a rate appreciably faster than prior art rare earth enhanced zeolitic catalyst compositions are produced by treating a previously rare earth exchanged zeolitic catalyst composition with a dilute solution containing cerium cations (or a mixture of rare earths rich in cerium). The final catalysts contain 0.5 to 4% cerium cations which are introduced to previously rare earth exchanged zeolitic catalyst particles prior to final filtering, rinsing and calcining. Cerium is described as an "oxidation promoter". There is not recognition or appreciation in the patent of the effect of the cerium impregnation of SOx stack emissions. Such impregnation of rare earth exchanged zeolitic catalyst particles is not always effective in producing modified catalysts having significant ability to bind oxides of sulfur in an FCC regenerator and release them in an FCC cracking reaction zone.

Thus, considerable amount of study and research effort has been directed to reducing oxide of sulfur emissions from various gaseous streams, including those from the stacks of the regenerators of FCC units. However, the results leave much to be desired. Many metallic compounds have been proposed as materials to pick up oxides of sulfur in FCC units (and other desulfurization applications) and a variety of supports, including particles of cracking catalysts and "inerts", have been suggested as carriers for active metallic reactants. Many of the proposed metallic reactants lose effectiveness when subjected to repeated cycling. Thus when Group II metal oxides are impregnated on FCC catalysts or various supports, the activity of the group II metals is rapidly reduced under the influence of the cyclic conditions. Discrete alumina particles, when combined with silica-containing catalyst particles and subjected to steam at elevated temperatures, e.g., those present in FCC unit regenerators, are of limited effectiveness in reducing SOx emissions Incorporation of sufficient chromium on an alumina support to improve SOx sorption results in undesirably increased coke and gas production.

Accordingly, an object of the present invention is the Provision of an improved composition and process for reducing emissions of sulfur oxides.

An additional object of the present invention is to provide an improved composition and process for reducing the emissions of sulfur oxides from the regeneration zones of hydrocarbon catalytic cracking units.

Another object of the invention is to provide an improved hydrocarbon conversion catalyst. These and other objects of the invention will become apparent from the following description and examples.

In one general aspect, the present invention involves a process for combusting solid, sulfur-containing material by contacting the material with gaseous oxygen in a combustion zone at combustion conditions to produce combustion products including sulfur oxide at least a portion of which is sulfur trioxide. The present improvement comprises carrying out this contacting in the presence of discrete entities containing an effective amount, preferably a major amount by weight, of at least one metal-containing spinel, preferably alkaline earth metal-containing spinel to thereby reduce the amount of sulfur oxide (relative to combustion in the essential absence of the discrete entities) emitted from the combustion zone.

In accordance with another aspect, the present invention involves a conversion process which is carried out, preferably in the substantial absence of added free hydrogen, in at least one chemical reaction zone in which sulfur-containing hydrocarbon feedstock is contacted with particulate material to form at least one hydrocarbon product and sulfur-containing carbonaceous material deposited on the particulate material and at least one regeneration zone in which at least a portion of the sulfur-containing carbonaceous material deposited on the solid particles is contacted with gaseous oxygen to combust the sulfur-containing carbonaceous material and to produce combustion products including sulfur oxide at least a portion of which is sulfur trioxide.

The present improvement comprises using a particulate material comprising (A) a major amount of solid particles capable of promoting the desired hydrocarbon chemical conversion at hydrocarbon conversion conditions and (B) a minor amount of discrete entities comprising (1) an effective amount, preferably a major amount of weight, i.e., at least about 50% by weight, of at least one metal-containing spinel, preferably alkaline earth metal containing spinel. In one preferred embodiment, the discrete entities also include a minor, catalytically effective amount of at least one crystalline aluminosilicate effective to promote hydrocarbon conversion, e.g., cracking, at hydrocarbon conversion conditions. The discrete entities are present in an amount sufficient to reduce the amount of sulfur oxides in the regeneration zone effluent when used in a reaction zone-regeneration zone system as described herein.

In one preferred embodiment, the particulate material, more preferably the discrete entities, further comprise a minor amount of at least one additional metal, e.g., a Group VIII platinum group metal, component capable of promoting the oxidation of sulfur dioxide to sulfur trioxide at the conditions in the regeneration zone.

The Group VIII platinum group metals include platinum, palladium, osmium, iridium, ruthenium and rhodium. The preferred platinum group metals are palladium and platinum, most preferably platinum.

The preferred relative amounts of the solid particles and discrete entities are about 80 to about 99 parts and about 1 to about 20 parts by weight, respectively. This catalyst system is especially effective for the catalytic cracking of a hydrocarbon feedstock to lighter, lower boiling products. The present catalyst system also has improved carbon monoxide oxidation catalytic activity stability.

In another preferred embodiment, the spinel comprising the present discrete entities has a surface area (by the conventional B.E.T. method) in the range of about 25 m$^2$/gm. to about 600 m$^2$/gm., more preferably about 40 m$^2$/gm. to about 400 m$^2$/gm., and still more preferably about 50 m$^2$/gm. to about 300 m$^2$/gm. These relatively high surface areas have been found to provide for improved reduction in sulfur oxide atmospheric emissions.

The improvement of this invention can be used to advantage with the catalyst being disposed in any conventional reactor-regenerator system, in ebullating catalyst bed systems, in systems which involve continuously conveying or circulating catalyst between reaction zone and regeneration zone and the like. Circulating catalyst systems are preferred. Typical of the circulating catalyst bed systems ar the conventional moving bed and fluidized bed reactor-regenerator systems. Both of these circulating bed systems are conventionally used in hydrocarbon conversion, e.g., hydrocarbon cracking, operations with the fluidized catalyst bed reactor-regenerator systems being preferred.

The catalyst system used in accordance with certain embodiments of the invention is comprised of a mixture of two types of solid particles.

Although the presently useful solid particles and discrete entities may be used as a physical admixture of separate particles, in one embodiment, the discrete entities are combined as part of the solid particles. That is, the discrete entities, e.g., comprising calcined microspheres containing metal-containing spinel, and preferably, at least one additional metal component, are combined with the solid particles, e.g., during the manufacture of the solid particles, to form combined particles which function as both the presently useful solid particles and discrete entities is preferably a separate and distinct phase. One preferred method for providing the combined particles is to calcine the discrete entities prior to incorporating the discrete entities into the combined particles.

The form, i.e., particle size, of the present catalyst particles, e.g., both solid particles and discrete entities as well as the combined particles, is not critical to the present invention and may vary depending, for example, on the type of reaction-regeneration system employed. Such catalyst particles may be formed into any desired shape such as pills, cakes, extrudates, powders, granules, spheres and the like, using conventional methods. Where, for example, the final catalyst is designed for use in hydrocarbon conversion operations employing a fixed bed of catalyst, the catalyst may preferably be formed into particles having a minimum dimension of at least about 0.01 inch and a maximum dimension up to about one-half inch or one inch or more. Spherical particles having a diameter of about 0.03 inch to about 0.25 inch, preferably about 0.03 inch to about 0.15 inch, are often useful, especially in fixed catalyst bed or moving catalyst bed operations. With regard to fluidized catalyst bed systems, it is preferred that the major amount by weight of the present catalyst particles have a diameter in the range of about 10 microns to about 250 microns, more preferably about 20 microns to about 150 microns.

The solid particles are capable of promoting the desired hydrocarbon conversion. The solid particles are further characterized as having a composition (i.e., chemical make-up) which is different from the discrete entities. In one preferred embodiment, the solid particles (or the solid particles portion of the combined particles described above) are substantially free of metal-containing spinel.

In one aspect of the present invention, the discrete entities comprise an effective amount of at least one metal-containing spinel, preferably alkaline earth metal-containing spinel, and, preferably, a minor, catalytically effective amount of at least one crystalline aluminosilicate capable of promoting hydrocarbon conversion at hydrocarbon conversion conditions. In another aspect of the present invention, the discrete entities, whether present as a separate and distinct particle and/or combined with the solid particles in a single, preferably substantially uniform, mass of combined particles, further comprise a minor amount of at least one additional metal, e.g., platinum group metal, component capable of promoting the oxidation of sulfur dioxide to sulfur trioxide at the conditions in the combustion, e.g., catalyst regeneration, zone. In a still further aspect of the invention, the solid particles and/or one or more other type of particles (i.e., having compositions different from the present solid particles or discrete entities) are included which contain one or more components capable of promoting the oxidation of sulfur dioxide to sulfur trioxide at combustion conditions, e.g., in the catalyst regeneration zone. For example, particles containing an effective amount of at least one sulfur oxide oxidation catalytic component, e.g., metal or compounds of metals selected from Group VI, IIB, IVB, VIA, VIB, VIIA and VIII and mixtures thereof, disposed on a support, e.g., one or more inorganic oxide, may be included with the present solid particles and discrete entities. As noted previously, the sulfur oxide oxidation component may be associated with, e.g., depositive or, the spinel component of the present discrete entities.

The composition of the solid particles useful in the present invention is not critical, provided that such particles are capable of promoting the desired hydrocarbon conversion. Particles having widely varying compositions are conventionally used as catalyst in such hydrocarbon conversion processes, the particular composition chosen being dependent, for example, on the type of hydrocarbon chemical conversion desired. Thus, the solid particles suitable for use in the present invention include at least one of the natural or synthetic materials which are capable of promoting the desired hydrocarbon chemical conversion. For example, when the desired hydrocarbon conversion involves one or more of hydrocarbon cracking, disproportionation, isomerization, polymerization, alkylation and dealkylation, such suitable materials include acid-treated natural clays such as montmorillonite, kaolin and bentonite clays; natural or synthetic amorphous materials, such as amorphous silica-alumina, silica-magnesia and silica-zirconia composites; crystalline aluminosilicate often referred to as zeolites or molecular sieves and the like. In certain instances, e.g., hydrocarbon cracking and disproportionation, the solid particles preferably include such crystalline aluminosilicate to increase catalytic activity. Methods for preparing such solid particles and the combined solid particles-discrete entities particles are conventional and well known in the art. For example, crystalline aluminosilicate compositions can be made from alkali metal silicates and alkali metal aluminates so that they initially contain significant concentrations of alkali metals. Sodium tends to reduce the catalyst activity of the composition for hydrocarbon conversion reactions such as hydrocarbon cracking and disproportionation. Accordingly, most or all of the sodium in the crystalline aluminosilicate is removed or replaced, e.g., with other metal cations such as calcium or aluminum ions or ions of the rare earths, which are associated with the crystalline aluminosilicates. This can be accomplished by contacting the crystalline aluminosilicate with a source of hydrogen ions such as acids, or hydrogen precursors such as ammonium compounds. These procedures are thoroughly described in U.S. Pats. No. 3,140,253 and RE. 27,639.

Compositions of the solid particles which are particularly useful in the present invention are those in which the crystalline aluminosilicate is incorporated in an amount effective to promote the desired hydrocarbon conversion, e.g., a catalytically effective amount, into a porous matrix which comprises, for example, amorphous material which may cr may not be itself capable promoting such hydrocarbon conversion. Included among such matrix materials are clays and amorphous compositions of silica-alumina, magnesia, zirconia, mixtures of these and the like. The crystalline aluminosilicate is preferably incorporated into the matrix material in amounts within the range of about 1% to about 75%, more preferably about 2% to about 50%, by weight of the total solid particles. The preparation of crystalline inosilicate-amorphous matrix catalytic materials is described in the above-mentioned patents. Catalytically active crystalline aluminosilicates which are formed during and/or as part of the methods of manufacturing the solid particles, discrete entities and/or combined particles are within the scope of the present invention. The solid particles are preferably substantially free of added rare earth metal, e.g., cerium component disposed on the amorphous matrix material of the catalyst, although such rare earth metal components may be associated with the crystalline aluminosilicate components of the solid particles.

As indicated above, the discrete entities utilized in the present invention comprise an effective amount, preferably a major amount, of at least one metal-containing spinel, preferably alkaline earth metal-containing spinel. In another aspect, the present discrete entities further comprise a minor amount of at least one additional metal, e.g., platinum group metal, component capable of promoting sulfur dioxide oxidation.

The spinel structure is based on a cubic close-packed array of oxide ions. Typically, the crystallographic unit cell of the spinel structure contains 32 oxygen atoms; one-eighth of the tetrahedral holes (of which there are two per anion) are occupied by divalent metal ion, and one-half of the octahedral holes (of which there are two per anion) are occupied by trivalent metal ions.

This typical spinel structure or a modification thereof is adaptable to many other mixed metal oxides of the type $M^{II}M_2^{III}O_4$ (e.g., $FeCr_2O_4$, $ZnAl_2O_4$ and $Co^{II}Co_{2hu III}O_4$), by some of the type $M^{IV}M^{II}_2O_4$ (e.g., $TiZn_2O_4$, and $SnCo_2O_4$), and by some of the type $M_2^IM^{VI}O_4$ (e.g., $Na_2MoO_4$ and $Ag_2MoO_4$). This structure is often symbolized as $X]Y_2]O_4$, where square brackets enclose the ions in the octahedral interstices. An important variant is the inverse spinel structure, $Y[XY]O_4$, in which half of the Y ions are in tetrahedral interstices and the X ions are in octahedral ones along with the other half of the Y ions. The inverse spinel structure is intended to be included within the scope of the term "metal-containing spinel" as used herein. The inverse spinel structure occurs often when the X ions have a stronger preference for octahedral coordination than do the Y ions. All $M^{IV}M_2^{II}O_4$ are inverse, e.g., $Zn(ZnTi)O_4$, and many of the $M^{II}M_2^{III}O_4$ ones are also, e.g., $Fe^{III}(Co^{II}Fe^{III})O_4$, $NiAl_2O_4$, $Fe^{III}(Fe^{II}Fe^{III})O_4$ and $Fe(NiFe)O_4$. There are also many compounds with distorted spinel structures in which only a fraction of the X ions are in tetrahedral sites. This occurs when the preference of both X and Y ions for octahedral and tetrahedral sites do not differ markedly.

Further, details on the spinel structure are described in the following references, which are hereby incorporated herein by reference: "Modern Aspects of Inorganic Chemistry" by H. I. Emeleus and A. G. Sharpe (1973), pp. 57–58 and 512–513; "Structural Inorganic Chemistry", 3rd edition, (1962) by A. F. Wells, pp. 130, 487–490, 503 and 526; and "Advanced Inorganic Chemistry", 3rd edition, by F. A. Cotton and G. Wilkinson (1972), pp. 54–55.

Metal-containing spinels include the following: $MnAl_2O_4$, $FeAl_2O_4$, $CoAl_2O_4$, $NiAl_2O_4$, $ZnAl_2O_4$, $MgTiMgO_4$, $FeMgFeO_4$, $FeTiFeO_4$, $ZnSnZnO_4$, $GaMgGaO_4$, $InMgInO_4$, $BeLi_2F_4$, $MoLi_2O_4$, $SnMg_2O_4$, $MgAl_2O_4$, $CuAl_2O_4$, $(LiAl_5O_8)$, $ZnK_2(CN)_4$, $CdK_2(CN)_4$, $HgK_2(CN)_4$, $ZnTi_2O_4$, $FeV_2O_4$, $MgCr_2O_4$, $MnCr_2O_4$, $FeCr_2O_4$, $CoCr_2O_4$, $NiCr_2O_4$, $ZnCr_2O_4$, $CdCr_2O_4$, $MnCr_2S_4$, $ZnCr_2S_4$, $CdCr_2S_4$, $TiMn_2O_4$, $MnFe_2O_4$, $FeFe_2O_4$, $CoFe_2O_4$, $NiFe_2O_4$, $CuFe_2O_4$, $ZnFe_2O_4$, $CdFe_2O_4$, $MgCo_2O_4$, $TiCo_2O_4$, $CoCo_2O_4$, $ZnCo_2O_4$, $SnCo_2O_4$, $CoCo_2S_4$, $CuCo_2S_4$, $GeNi_2O_4$, $NiNi_2S_4$, $ZnGa_2O_4$, $WAg_2O_4$, and $ZnSn_2O_4$.

The presently useful metal-containing spinels include a first metal and a second metal having a valence (oxidation state) higher than the valence of the first metal. The first and second metals may be the same metal or different metals. In other words, the same metal may exist in a given spinel in two or more different oxidation states. As indicated above, the atomic ratio of the first metal to the second metal in any given spinel need not be consistent with the classical stoichiometric formula for such spinel. In one embodiment, the atomic ratio of the first metal to the second metal in the metal-containing spinel useful in the present invention is at least about 0.17 and preferably at least about 0.25. If the first metal is a mono-valent metal, the atomic ratio of the first metal to the second metal is preferably at least about 0.34, more preferably at least about 0.5.

The preferred metal-containing spinels for use in the present invention are alkaline earth metal spinels, in particular magnesium aluminate spinel. Lithium containing spinels, which may be produced using conventional techniques are also preferred for use. Other alkaline earth metal ions, such as calcium, strontium, barium and mixtures thereof, may replace all or a part of the magnesium ions. Similarly, other trivalent metal ions, such as iron, chromium, vanadium, manganese, gallium, boron, cobalt and mixtures thereof, may replace all or a part of the aluminum ions. When the spinel includes a divalent metal (e.g., magnesium) and a trivalent metal (e.g., aluminum), it is preferred that the atomic ratio of divalent to trivalent metals in the spinel be in the range of about 0.17 to about 1, more preferably about 0.25 to about 0.75, still more preferably about 0.35 to about 0.65 and still further more preferably about 0.45 to about 0.55.

The metal-containing spinels useful in the present invention may be derived from conventional and well known sources. For example, these spinels may be naturally occurring or may be synthesized using techniques well known in the art. Thus, a detailed description of such techniques is not included herein. However, a brief description of the preparation of the most preferred spinel, i.e., magnesium aluminate spinel, is set forth below. Certain of the techniques described, e.g., drying and calcining, have applicability to other metal-containing spinels.

The magnesium aluminate spinel suitable for use in the present invention can be prepared, for example, according to the method disclosed in U.S. Pat. No. 2,992,191. The spinel can be formed by reacting, in an aqueous medium, a water-soluble magnesium inorganic salt and a water-soluble aluminum salt in which the aluminum is present in the anion. Suitable salts are exemplified by the strongly acidic magnesium salts such as the chloride, nitrate or sulfate and the water soluble alkali metal aluminates. The magnesium and aluminate salts are dissolved in an aqueous medium and a spinel precursor is precipitated through neutralization of the aluminate by the acidic magnesium salt. Excesses of acid salt or aluminate are preferably not employed, thus avoiding the precipitation of excess magnesia or alumina. Preferably, the precipitate is washed free of extraneous ions before being further processed.

The precipitate can be dried and calcined to yield the magnesium aluminate spinel. Drying and calcination may take place simultaneously. However, it is preferred that the drying take place at a temperature below which water of hydration is removed from the spinel precursor. Thus, this drying may occur at temperatures below about 500° F., preferably from about 220° F. to about 450° F. Suitable calcination temperatures are exemplified by temperatures ranging from about 800° F. to about 2000° F. or more. Calcination of the spinel precursor may take place in a period of time of at least about one half hour and preferably in a period of time ranging from about 1 hour to about 10 hours.

Another process for producing the presently useful magnesium aluminate spinel is set forth in U.S. Pat. No. 3,791,992. This process includes mixing a solution of a soluble acid salt of divalent magnesium with a solution of an alkali metal aluminate; separating and washing the resulting precipitate; exchanging the washed precipitate with a solution of an ammonium compound to decrease the alkali metal content; followed by washing, drying, forming and calcination steps. The disclosure of U.S. Pat. No. 3,791,992 is hereby incorporated herein by reference. In general, as indicated previously, the metal-containing spinels useful in the present invention may be prepared by methods which are conventional and well known in the art.

The metal spinel-based composition may be formed into particles of any desired shape such as pills, cake, extrudates, powders, granules, spheres, and the like using conventional methods. The size selected for the particles can be dependent upon the intended environment in which the final discrete entities are to be used—as, for example, whether in a fixed catalyst bed or circulating catalyst bed reaction system or whether as a separate particle or as part of a mass of combined particles.

Substantially non-interfering proportions of other well known refractory material, e.g., inorganic oxides such as silica, zirconia, thoria and the like may be included in the present discrete entities. Free magnesia and/or alumina (i.e., apart from the alkaline earth metal containing spinel) also may be included in the discrete entities, e.g., using conventional techniques. For example, the discrete entities may include about 0.1% to about 25% by weight of free magnesia (calculated as MgO). By substantially "non-interferring" is meant amounts of other material which do not have a substantial deleterious effect on the present catalyst system or hydrocarbon conversion process. The inclusion of materials such as silica, zirconia, thoria and the like into the present discrete entities may act to improve one or more of the functions of the discrete entities.

The presently useful lithium-containing spinels, e.g., lithium aluminate spinel, preferably are associated with a minor amount of at least one rare earth metal component.

Cerium or other suitable rare earth or rare earth mixture may be associated with the spinel using any suitable technique or combination of techniques; for example, impregnation, coprecipitation, ion-exchange and the like, well known in the art, with impregnation being preferred. Impregnation may be carried out by contacting the spinel with a solution, preferably aqueous, of rare earth; for example, a solution containing cerium ions (preferably $Ce^{+3}$, $Ce^{+4}$ or mixtures thereof) or a mixture of rare earth cations containing a substantial amount (for example, at least 40%) of cerium ions. Water-soluble sources of rare earth include the nitrate and chloride. Solutions having a concentration of rare earth in the range of 3 to 30% by weight are preferred. Preferably, sufficient rare earth salt is added to incorporate about 0.05 to 25% (weight), more preferably about 0.1 to 15% rare earth, and still more preferably about 1.0 to 15% rare earth, by weight, calculated as elemental metal, on the particles.

It may not be necessary to wash the spinel after certain soluble rare earth salts (such as nitrate or acetate) are added. After impregnation with rare earth salt, the spinel can be dried and calcined to decompose the salt, forming an oxide in the case of nitrate or acetate. Alternatively the spinel, e.g., in the form of discrete particles, can be charged to a hydrocarbon conversion, e.g., cracking unit with the rare earth in salt form. In this case a rare earth salt with a thermally decomposable anion can decompose to the oxide in the reactor and be available to associate with SOx in the regenerator.

Especially good results were achieved using spinel containing discrete entities such that the concentration of rare earth metal, e.g., cerium, calculated as the metal, is in the range of about 1 to 25%, more preferably about 2% to about 15%, by weight of the total discrete entities.

The present discrete entities preferably further comprise a minor amount of at least one crystalline aluminosilicate capable of promoting the desired hydrocarbon conversion. Typical aluminosilicates have been described above. Preferably, such aluminosilicates comprise about 1% to about 30%, more preferably about 1% to about 10%, by weight of the discrete entities. The presence of such aluminosilicates in the present discrete entities acts to increase the overall catalytic activity of the solid particles-discrete entities mixture for promoting the desired hydrocarbon conversion.

As indicated above, in one preferred embodiment the presently useful particulate material, e.g., the discrete entities utilized in the present invention, also contain at least one additional metal, e.g., platinum group metal, component. These additional metal components are defined as being capable of promoting the oxidation of sulfur dioxide to sulfur trioxide at combustion conditions, e.g., the conditions present in the catalyst regenerator. Increased carbon monoxide oxidation may also be obtained by including at least one of the additional metal components. Such metal components are selected from the group consisting of Group IB, IIB, IVB, VIA, VIB, VIIA and VIII of the Periodic Table, the rare earth metals, vanadium, iron, tin and antimony and mixtures thereof and may be incorporated into the presently useful particulate material, e.g., the discrete entities, in any suitable manner. Many techniques for including the additional metal in the particulate material are conventional and well known in the art. The additional metal, e.g., platinum group metal, such as platinum, may exist within the particulate material, e.g., discrete entities, at least in part as a compound such as an oxide, sulfide, halide and the like, or in the elemental state. Generally, the amount of the platinum group metal component present in the final discrete entities is small compared to the quantity of the spinel. The platinum group metal component preferably comprises from about 0.05 parts-per-million (ppm) to about 1%, more preferably about 0.05 ppm. to about 1,000 ppm., and still more preferably about 0.5 ppm. to about 500 ppm., by weight of the discrete entities, calculated on an elemental basis. Excellent results are obtained when the discrete entities contain about 50 ppm. to about 200 ppm., and in particular about 50 ppm. to about 90 ppm., by weight of at least one platinum group metal component. The other additional metals may be included in the particulate material in an amount effective to promote the oxidation of at least a portion, preferably a major portion, of the sulfur dioxide present to sulfur trioxide at the conditions of combustion, e.g., conditions present in the catalyst regeneration zone of a hydrocarbon catalytic cracking unit. Preferably, the present discrete entities comprise a minor amount by weight of at least one additional metal component (calculated as elemental metal). Of course the amount of additional metal used will depend, for example, on the degree of sulfur dioxide oxidation desired and the effectiveness of the additional metal component to promote such oxidation.

Alternately to inclusion in the discrete entities, one or more additional metal components may be present in all or a portion of the above-noted solid particles and/or may be included in a type of particle other than either the present solid particles or discrete entities. For example, separate particles comprising at least one additional metal component and porous inorganic oxide support, e.g., platinum on alumina, may be included along with the solid particle and discrete entities to promote sulfur dioxide oxidation.

The additional metal, e.g., platinum group metal, component may be associated with the spinel based composition in any suitable manner, such as by the impregnation of the spinel at any stage in its preparation and either after or before calcination of the spinel based composition. As indicated previously, various procedures for incorporating the additional metal component or components into the particulate material are conventional and well known in the art. Preferably, the additional metal component is substantially uniformly disposed on the spinel of the present discrete entities. One preferred method for adding the platinum group metal to the spinel involves the utilization of a water soluble compound of the platinum group metal to impregnate the spinel. For example, platinum may be added to the spinel by comingling the spinel with an aqueous solution of chloroplatinic acid. Other water-soluble compounds of platinum may be employed as impregnation solutions, including, for example, ammonium chloroplatinate and platinum chloride.

Both inorganic and organic compounds of the platinum group metals are useful for incorporating the platinum group metal component into the present discrete entities. Typically, such inorganic compounds include ruthenium nitrate, ruthenium acetate, ruthenium chloride, rhodium trichloride, rhodium acetate, ammonium palladium hexachloride, palladium chloride, diamminedichloropalladium, diamminedinitropalladium, tetraamminepalladium chloride, tetraaminepalladium hydroxide, palladium nitrate, palladium acetate, osmium tetroxide, ammonium platinum hexachloride, diamminedichloroplatinum, diamminedinitroplatinum, tetraammineplatinous hydroxide and the like. Platinum group metal compounds, such as chloroplatinic acid and palladium chloride are preferred.

Representative organic metal-containing compounds which can be used to incorporate the platinum group metal component into the discrete entities include ruthenocene, tricarbonyltris(triphenylphosphino)ruthenium, palladium, dichloro(ethylene)palladium(II) dimer, $\pi$-cyclopentadinyldicarbonylosmium(I) dimer, platinum acetylacetonate, dichlorodicarbonylplatinum(II), trimethylplatinum chloride, dichlorotetracarbonyldirhodiumI) chlorocarbonylbis(triphenylphosphino)rhodium), triiodotricarbonyliridium(III), trichlorobis(trichlorophosphino)iridiumIII) and the like.

It may be desirable to be able to separate the discrete entities from the solid particles, for example, when it is desired to use the solid particles alone for hydrocarbon conversion of where it is desired to recover the discrete entities for other uses or for example, for platinum group metal recovery. This can be conveniently accomplished by preparing the second solid particles in a manner such that they have a different size than the first solid particles. The separation of the first and second solid particles can then be easily effected by screening or other means of size segregation.

As noted above, the presently useful solid particles and discrete entities ca be employed in a mass of combined particles which function as both the solid particles, e.g., promotes hydrocarbon conversion, and the discrete entities. Such combined particles may be produced in any suitable manner, certain of which methods are conventional and known in the art.

Although this invention is useful in many hydrocarbon chemical conversions, the present catalyst, i.e., mixture comprising solid particles and discrete entities, and process and particular applicability in systems for the catalytic cracking of hydrocarbons and the regeneration of catalyst so employed. Such catalytic hydrocarbon cracking often involves converting, i.e., cracking, heavier or higher boiling hydrocarbons to gasoline and other lower boiling components, such as hexane, hexene, pentane, pentene, butane, butylene, propane, propylene, ethane, ethylene, methane and mixtures thereof. Often, the substantially hydrocarbon feedstock comprises a gas oil fraction, e.g., derived from petroleum, shale oil, tar sand oil, coal and the like. Such feedstock may comprise a mixture of straight run, e.g., virgin, gas oil. Such gas oil fractions often boil primarily in the range of about 400° F. to about 1000° F. Other substantially hydrocarbon feedstocks, e.g., other high boiling or heavy, fractions of petroleum, shale oil, tar sand oil, coal and the like may be cracked using the catalyst and method of the present invention. Such substantially hydrocarbon feedstock often contains minor amounts of contaminants, e.g., sulfur, nitrogen and the like. In one aspect, the present invention involves converting a hydrocarbon feedstock containing sulfur and/or sulfur chemically combined with the molecules of hydrocarbon feedstock. The present invention is particularly useful when the amount of sulfur in such hydrocarbon feedstock is in the range of about 0.01% to about 5%, Preferably about 0.1% to about 3%, by weight of the total feedstock.

Hydrocarbon cracking conditions are well known and often include temperatures in the range of about 850° F. to about 1100° F., preferably about 900° F. to about 1050° F. Other reaction conditions usually include pressures of up to about 100 psia.; catalyst to oil ratios of about 1 to 2 to about 25 to 1, preferably about 3 to 1 to about 15 to 1; and weight hourly space velocities (WHSV) of from about 3 to about 60. These hydrocarbon cracking conditions may be varied depending, for example, on the feedstock and solid particles or combined particles being used and the product or products wanted.

In addition, the catalytic hydrocarbon cracking system includes a regeneration zone for restoring the catalytic activity of the solid particles or combined particles of catalyst previously used to promote hydrocarbon cracking. Carbonacecus, in particular sulfur-containing carbonaceous, deposit-containing catalyst particles from the reaction zone are contacted with free oxygen-containing gas in the regeneration zone at conditions to restore or maintain the activity of the catalyst by removing, i.e., combusting, at least a portion of the carbonaceous material from the catalyst particles. When the carbonaceous deposit material contains sulfur, at least on sulfur-containing combustion product is produced in the regeneration zone and may leave the zone with the regenerator flue gas. The conditions at which such free oxygen-containing gas contacting takes place may vary, for example, over conventional ranges. The temperature in the catalyst regeneration zone of a hydrocarbon cracking system is often in the range of about 900° F. to about 1500° F., preferably about 1100° F. to about 1350° F. and more preferably about 1100° F. to about 1300° F. Other conditions within such regeneration zone may include, for example, pressures up to about 100 psia., average catalyst contact times within the range of about 3 minutes to about 120 minutes, preferably from about 3 minutes to about 75 minutes. Sufficient oxygen is preferably present in the regeneration zone to completely combust the carbon and hydrogen of the carbonaceous deposit material, for example, to carbon dioxide and water. The amount of carbonaceous material deposited on the catalyst in the reaction zone is preferably in the range of about 0.005% to about 15%, more preferably about 0.1% to about 5% by weight of the catalyst. The amount of carbonaceous material deposited on the catalyst in the reaction zone is preferably in the range of about 0.005% to about 15%. more preferably about 0.1% to about 10%, by weight of the catalyst. The amount of sulfur, if any, contained in the carbonaceous deposit material depends, for example, on the amount of sulfur in the hydrocarbon feedstock. This deposit material may contain about 0.01% to about 10% or more by weight of sulfur. At least a portion of the regenerated catalyst is often returned to the hydrocarbon cracking reaction zone.

The solid particles useful in the catalytic hydrocarbon cracking embodiment of the present invention may be any conventional catalyst capable of promoting hydrocarbon cracking at the conditions present in the reaction zone, i.e., hydrocarbon cracking conditions. Similarly, the catalytic activity of such solid particles is restored at the conditions present in the regeneration zone. Typical among these conventional catalyst are those which comprise amorphous silica-alumina and at least one crystalline aluminosilicate having pore diameters of about 8Å to about 15Å and mixtures thereof. When the solid particles and/or discrete entities to be used in the hydrocarbon cracking embodiment of the present invention contain crystalline aluminosilicate, the crystalline aluminosilicate may include minor amounts of conventional metal promoters such as the rare earth metals in particular, cerium.

As indicated previously, one embodiment of the present invention involves contacting solid, sulfur-containing material in a combustiOn Zone at combustion conditions to produce combustion products including at least one sulfur oxide at least a portion of which is sulfur trioxide. Reduced emissions of sulfur oxide from the combustion zone are achieved by carrying out this contacting in the presence of discrete entities containing at least one alkaline earth metal spinel and at least one rare earth metal component.

Typical solid material combustion zones include, for example, fluid bed coal burning steam boilers and fluid sand bed waste combustors. The present discrete entities have sufficient strength to withstand the conditions in such combustion zones. In the coal fired boiler application, the discrete entities are added, either separately or with the sulfur-containing coal, to the combustion zone, e.g., boiler, where combustion takes place and at least some sulfur trioxide is formed The discrete entities leave the combustion zone with the coal ash and can be separated from the ash, e.g., by screening, density separation, or other well known solids separation techniques The flue gases leaving the combustion zone have reduced amounts of sulfur oxide, e.g., relative to combustion in the absence of the discrete entities. The discrete entities from the combustion zone can then be subjected to a reducing environment, e.g., contacted with $H_2$, at conditions such that at least a portion of the sulfur associated with the discrete entities disassociates with the discrete entities, e.g., in the form of $H_2S$, and is removed for further processing, e.g., sulfur recovery. The discrete entities, after sulfur removal may be recycled to the combustion zone, e.g., boiler.

Conditions within the boiler may be those typically used in fluid-bed coal burning boilers. The amount of discrete entities used is sufficient to reduce sulfur oxide emissions in the boiler flue gas, preferably, by at least about 50% and more preferably by at least about 80%. Conditions within the reducing zone are such that at least a portion, preferably at least about 50% and more preferably at least about 80% of the sulfur associated with the discrete entities is removed. For example, reducing conditions may include temperatures in the range of about 900° F. to about 1800° F.; pressures in the range of about 14 to about 100 psia; and $H_2$ to associated sulfur mole ratio in the range of about 1 to about 10.

In the fluid sand bed waste combustion application, the fluid sand, e.g., which acts as a heat sink, may be combined with the discrete entities and circulated from the combustion zone to the reduction zone. Reduced emissions of sulfur oxide from the combustion zone are thus achieved.

Conditions in the combustion zone may be as typically employed in fluid sand bed warte combustors. The amount of discrete entities employed is sufficient to reduce sulfur oxide emissions in the combuster flue gases, preferably by at least about 50% and more preferably by at least about Conditions within the reducing zone are similar to those set forth above for the coal fired boiler application.

The following examples are provided to better illustrate the invention, without limitation, by presenting several specific embodiments of the process of the invention.

EXAMPLE I

This example illustrates the production of discrete entities useful in the present invention.

7.05 lb. sodium aluminate (analyzed as 29.8% by weight $Na_2O$ and 44.85% by weight of was stirred with one gallon deionized water to bring as much as possible into solution. This was filtered through cloth with a 10" Buchner funnel. The filtered solution was diluted to 8 liters with deionized water.

7.95 lb. $Mg(NO_3)_2 6H_2O$ was dissolved in one gallon deionized water, and 166 ml. of concentrated $HNO_3$ was added. The solution was diluted to 8 liters with deionized water.

The two final solutions were run simultaneously from burettes into 32 liters deionized water in a 30 gallon rubber lined drum. The mix was stirred vigorously during the addition. Addition of the $Mg(NO_3)_2$ solution required 36 minutes. 2760 ml. of the sodium aluminate solution was added during this period. The pH was held between 7.0 and 7.5. After addition of all the magnesium nitrate-containing solution, sodium aluminate solution was added to bring the pH to 8.5. After this, 1080 ml of sodium aluminate solution remained and was discarded.

The mix was held overnight and then filtered with a plate-frame press. The cake was washed in the press with 110 gallons deionized water. The cake was reslurried in 10 gallons deionized water. A solution of 26 grams $Mg(NO_3)_2 6H_2O$ in 200 ml. deionized water was added to the slurry. The slurry was filtered and washed as before. After a repeat of the slurry, filter, and wash, the cake was dried at about 250° F. in a forced air drying oven.

The dried product was then hammermilled, first on a 0.050" screen, then the 0-60 mesh portion was hammermilled again, this time on the 0.010screen. The desirable, fine material was then screened through a 60 mesh screen. The so obtained product, magnesium aluminate spinel precursor, was then transferred into a 59 mm diameter quartz tube, where it was calcined, in a fluidized state, for 3 hours at 900° F. with an air flow rate of about 106 liters per hour to form magnesium aluminate spinel which was found to have an atomic ratio of magnesium to aluminum of about 0.48.

The surface area of the spinel-containing material after calcination at 900° F. for three hours was determined to be about 180 $m^2/gm$. A portion of this material was further calcined at 1350° F. for 3 hours in a muffle furnace. This further calcined material had a surface area of about 136 $m^2/gm$.

The resulting magnesium aluminate spinel particles are screened to produce final particles having diameters less than 100 microns.

EXAMPLE II

Example I is repeated except that final magnesium aluminate spinel particles are impregnated using conventional techniques, with an aqueous solution of chloroplatinic acid. The resulting particles are dried and calcined and contain about 100 ppm. of platinum, by weight of the total platinum-containing particles, calculated as elemental platinum. The platinum is substantially uniformly distributed on the spinel-containing particles.

EXAMPLE III

A quantity of solid particles of a commercially available hydrocarbon cracking catalyst containing about 6% by weight of crystalline aluminosilicate, about 54% by weight amorphous silica-alumina and 40% by weight alpha alumina, and having the same approximate size as the final particles from Example I, is combined with the final particles of Example I so that a mixture of 5 parts by weight of discrete entities and 95 parts by weight of the solid particles results. The catalytic activity of the solid particles is equilibrated by using same (prior to combining with the discrete entities) in commercial fluid bed catalytic cracking service.

The mixture of solid particles and final particles is loaded to a conventional fluid bed catalytic cracking unit (FCCU) and used to crack a petroleum derived gas oil fraction, a combined fresh feed and recycle stream. The fresh gas oil fraction boils in the range of about 400° F. to about 1000° F. and is substantially hydrocarbon in nature, containing minor amounts of sulfur and nitrogen as contaminants. Conventional hydrocarbon cracking and catalyst regeneration conditions are employed in the reaction zone and regeneration zone, respectively.

Briefly, such FCC units involve two vessels in at least limited fluid communication with each other. One vessel serves as a reaction zone. Hydrocarbon feedstock and catalyst particles are fed to the reaction zone at hydrocarbon cracking conditions. At least a portion of the hydrocarbon cracking occurs in this reaction zone, where the catalyst and hydrocarbon form a fluid phase or bed.

Catalyst and hydrocarbon are continuously drawn from the reaction zone. The hydrocarbon is sent for further processing, distillation and the like. Catalyst, stripped of hydrocarbon, flows to the other vessel, catalyst regeneration zone, where it is combined with air at proper conditions to combust at least a portion of the carbonaceous deposits from the catalyst formed during the hydrocarbon cracking reaction. The catalyst and vapors in the regeneration zone form a fluid phase or bed. Catalyst is continuously removed from the regeneratior zone and is combined with the hydrocarbon feedstock prior to being fed to the reaction zone.

The weight ratio of catalyst particles to total (fresh plus recycle) hydrocarbon feed entering the reaction zone is about 6 to 1. Other conditions within the reaction zone include:

| | |
|---|---|
| Temperature, °F. | 930 |
| Pressure, psia. | 15 |
| WHSV | 15 |

Such conditions result in about 70% by volume conversion of the gas oil feedstock to products boiling at 400° F. and below.

The catalyst particles from the reaction zone include about 0.8% by weight of carbonaceous deposit material which is at least partially combusted in the regeneration zone. This carbonaceous material also includes a minor amount of sulfur which forms $SO_2$ at the combustion conditions formed in the regeneration zone. Air, in an amount so that amount of oxygen in the regeneration zone is about 1.15 times the amount theoretically required to completely combust this deposit material, is heated to the desired temperature before being admitted to the regeneration zone. Conditions within the regeneration zone include:

| | |
|---|---|
| Temperature, °F. | 1100 |
| Pressure, psia. | 15 |
| Average Catalyst Residence Time, min. | 30 |

After a period of time, the catalyst is shown to retain effective to promote hydrocarbon cracking in the reaction zone, and reduced emissions of sulfur (as sulfur oxides) from the flue gases of the regeneration zone are obtained (relative to processing in the absence of the final magnesium aluminate spinel-containing particles.)

EXAMPLE IV

Example III is repeated, except that the platinum-containing particles of Example II are used instead of the magnesium aluminate spinel particles of Example I. After a period of time, the catalyst is shown to remain effective to promote hydrocarbon cracking in the reaction zone and carbon monoxide and sulfur dioxide oxidation in the regeneration zone. In addition, reduced emissions of sulfur (as sulfur oxides) from the flue gases of the regeneration zone are obtained (relative to processing in the substantial absence of the platinum-containing particles).

EXAMPLE V

Examples I and II are repeated, except that the final magnesium aluminate spinel particles and the platinum-containing particles, respectively, include about 7% by weight of a crystalline aluminosilicate known to be catalytically active to promote hydrocarbon cracking. The crystalline aluminosilicate is incorporated into the particles using conventional, well known techniques. The platinum component is included in the particles so that a substantial amount, e.g., greater than about 50%, of the platinum is associated with the magnesium aluminate spinel of the particles, rather than with the crystalline aluminosilicate.

EXAMPLES VI AND VII

Examples III and IV are repeated except that the magnesium aluminate-containing spinel particles and platinum-containing particles produced in Example V are used in place of the particles of Examples I and II, respectively. After a period of time in hydrocarbon cracking service, these catalyst mixtures are shown to be effective to promote hydrocarbon cracking and reduced sulfur emissions from the regeneration zone are obtained. In particular, it is found that the crystalline aluminosilicate present in the discrete entities improves the hydrocarbon cracking in the reaction zone beyond that occurring in a system with discrete entities containing substantially no zeolitic component.

EXAMPLE VIII

A mass of combined particles is prepared as follows:
The magnesium aluminate spinel-based discrete entities are prepared by forming an aqueous slurry of magnesium aluminate spinel precursor (produced as in Example I) so that the spinel concentration, calculated as $MgAl_2O_4$, is about 9% by weight. Sufficient crystalline aluminosilicate known to be effective to promote hydrocarbon cracking is added to the slurry so that the final magnesium aluminate spinel-based discrete entities contain, on a dry weight basis, about 10% of such crystalline aluminosilicate. This slurry is stirred for about 1 hour to insure uniformity and then spray dried at a temperature less than that required to eliminate a substantial portion of the water of hydration to form discrete entities. These discrete entities are calcined in an electric muffle furnace using a programmed timer to increase the temperature 300° F. per hour to 1050° F. and maintain this temperature for 3 hours. The discrete entities are impregnated with platinum as in Example II. The final discrete entities contain about 100 ppm. by weight of platinum. A major portion of the platinum is associated with the spinel, rather than the crystalline aluminosilicate.

Essentially all the calcined discrete entities have a maximum dimension of less than about 200 microns. The discrete entities larger than 60 microns are discarded.

The solid particles-binder material is prepared by adding 6000 parts by weight of a solution containing Philadelphia Quartz Company "E" brand sodium silicate solution diluted with an equal weight of water to 3000 parts by weight of dilute density-1.234) $H_2SO_4$. After these two solutions are thoroughly mixed, 4000 parts by weight of a solution containing 1200 parts by weight of $Al_2(SO_4)_3$ $18H_2O$ is added. Sufficient crystalline aluminosilicate, known to be effective to promote hydrocarbon cracking, is added to the mixture so that the final solid particles-binder material contains, on a dry weight basis, about 10% of such crystalline aluminosilicate. The resulting mixture is let stand to gel. The resulting hydrogel is cut into about ¾" cubes and covered with concentrated $NH_4OH$ diluted with an equal volume of water. This material is let stand overnight and has a final pH of 11. The material is then washed by percolation until free of $Na^+$ and $SO_4^=$ ion.

500 parts (on a dry weight basis) of the washed hydrogel and 80 parts (on a dry weight basis) of the remaining calcined discrete entities and 10,000 parts by weight of water are thoroughly mulled, ground and mixed with agitation. The resulting slurry is dried in a spray drier. This drier is equipped with a two-fluid nozzle system which uses air at about 20 psig. to disperse the slurry into the drying chamber. The drying gas, i.e., flue gas from an inline burner, enters the drying chamber at about 750° F. and exits the chamber at a temperature which ranges from about 305° F. to 315° F. This drying gas in introduced into the top of the drying chamber while the slurry is dispersed upward from near the bottom of the chamber. In this way, the material to be dried is exposed to both counter-current flow (during assent from the nozzle system) and co-current flow (during gravity dissent) relative to the downward drying gas flow. The resulting dried particles are calcined in a manner similar to the calcination of the spinel based discrete entities described above. The resulting combined particles are screened to provide particles properly sized for use in a fluidized catalytic bed reaction zone-regenerator hydrocarbon cracking system.

EXAMPLE IX

Example III is repeated except that the physical mixture of discrete entities and catalyst particles used in Example III are replaced by the combined particles produced in Example VIII. After a period of time, these combined particles are shown to remain effective to promote both hydrocarbon cracking in the reaction zone and to reduce the amount of sulfur atmospheric emissions in the regeneration zone flue gases.

EXAMPLE X

Example I is repeated except that $Li(NO_3)\cdot 3H_2O$ is substituted for the $Mg(NO_3)_2\cdot 6H_2O$. The resulting final lithium aluminate spinel particles have diameters less than 100 microns. The atomic ratio of lithium ions to aluminum ions in the resulting spinel is about 0.2 and has a surface area greater than about 100 $m^2/gm$.

EXAMPLE XI

The final particles of Example X are impregnated, using conventional techniques with chloroplatinic acid. The resulting spinel-containing particles are dried and calcined and contain about 100 ppm. of platinum, by weight of the total platinum-containing particles, calculated as elemental platinum. The platinum is substantially uniformly distributed on the spinel-containing particles.

EXAMPLE XII

The final particles of Example X are impregnated, using conventional techniques, with cerium-using as aqueous cerium nitrate solution. The resulting spinel-containing particles are dried and calcined and contain about 10% by weight of cerium, calculated as elemental cerium.

EXAMPLES XIII to XV

Example III is repeated three times except that the final particles of Example I are replaced by the resulting spinel-containing particles of Examples X, XI and XII, respectively. In each instance, reduced emissions of sulfur (as sulfur oxides) from the flue gases of the regenerator zone is obtained.

EXAMPLES XVI to XX

Particles having diameters of less than 100 microns of the following substantially stoichiometric spinel materials are prepared using conventional techniques:

| Example | Spinel |
| --- | --- |
| XVI | $FeAl_2O_4$ |
| XVII | $MnAl_2O_4$ |
| XVIII | $MgCr_2O_4$ |
| XIX | $Fe_2TiO_4$ |
| XX | $MgFe_2O_4$ |

EXAMPLES XXI to XXV

Example III is repeated five additional times except that the final particles of Example I are replaced by the spinel-containing particles of Examples XVI, XVII, XVIII, XIX and XX, respectively. In each instance, reduced emissions of sulfur (as sulfur oxides) from the flue gases of the regenerator zone is obtained.

While this invention has been described with respect to various specific examples and embodiments, it is to be understood that the invention is not limited thereto and that it can be variously practiced within the scope of the following claims.

We claim:

1. A composition of matter comprising, in intimate admixture, a major amount of solid particles capable of promoting hydrocarbon conversion at hydrocarbon conversion conditions, said solid particles including at least one crystalline aluminosilicate capable of promoting said hydrocarbon conversion, and a minor amount of discrete entities having a composition different from said solid particles and comprising at least one metal-containing spinel which includes a first metal and at least two different second metals having valences higher than the valence of said first metal, one of said second metals being aluminum, and the other of said second metals being trivalent and selected from the group consisting of iron, chromium, vanadium, manganese, gallium, boron, cobalt and mixtures thereof, the atomic ratio of said first metal to said second metals in said spinel being at least about 0.17 and said spinel having a surface area in the range of about 25 $m^2/gm$. to about 600 $m^2/gm$.

2. The composition of claim 1 wherein said discrete entities further comprise about 0.1% to about 25% by weight of free magnesia, calculated as MgO.

3. The composition of claim 1 wherein said hydrocarbon conversion comprises hydrocarbon cracking in the substantial absence of added molecular hydrogen and a major amount, by weight, of said solid particles having diameters in the range of about 10 microns to about 250 microns.

4. The composition of claim 3 wherein said discrete entities contain at least about 70% by weight of said spinel.

5. The composition of claim 3 wherein at least one of said solid particles and discrete entities further comprise a minor, catalytically effective amount of at least one additional metal component capable of promoting the conversion of sulfur dioxide to sulfur trioxide.

6. The composition of claim 3 wherein said spinel comprises alkaline earth metal-containing spinel, and the atomic ratio of said first metal to said aluminum is at least about 0.25.

7. The composition of claim 3 wherein said solid particles are separate from said discrete entities and the relative amounts of said solid particles and said discrete entities are in the range or about 80 parts to about 99 parts and about 1 part to about 20 parts by weight, respectively.

8. The composition of claim 3 wherein said spinel includes magnesium as said first metal.

9. The composition of claim 3 wherein said discrete entities contain at least about 90% by weight of said spinel.

10. The composition of claim 3 wherein said other second metal is iron.

11. The composition of claim 10 wherein said discrete entities further comprise about 0.1% to about 25% by weight of free magnesia, calculated as MgO.

12. The composition of claim 3 wherein said other second metal is chromium.

13. The composition of claim 12 wherein said discrete entities further comprise about 0.1% to about 25% by weight of free magnesia, calculated as MgO.

14. The composition of claim 3 wherein said discrete entities further comprise about 0.1% to about 25% by weight of free magnesia, calculated as MgO.

15. The composition of claim 3 wherein said solid particles and said discrete entities are both present in combined particles.

16. A composition of matter comprising, in intimate admixture, a major amount of solid particles capable of promoting hydrocarbon conversion at hydrocarbon conversion conditions, said solid particles including at least one crystalline aluminosilicate capable of promoting said hydrocarbon conversion, and a minor amount of discrete entities having a composition different from said solid particle and comprising a major amount of at least one metal-containing spinel which includes a first metal and at least two different second metals having valences higher than the valence of said first metal, one of said second metals being aluminum and the other of said second metals being trivalent and selected from the group consisting of iron, chromium, vandium, manganese, gallium, boron, cobalt and mixtures thereof the atomic ratio of said first metal to said second metals is said spinel being at least 0.17.

17. The composition of claim 16 wherein said spinel includes magnesium as said first metal.

18. The composition of claim 16 wherein said other second metal is iron.

19. The composition of claim 18 wherein said discrete entities further comprise about 0.1% to about 25% by weight of free magnesia, calculated as MgO.

20. The composition of claim 16 wherein said other second metal is chromium.

21. The composition of claim 20 wherein said discrete entities further comprise about 0.1% to about 25% by weight of free magnesia, calculated as MgO.

22. The composition of claim 16 wherein said discrete entities further comprise about 0.1% to about 25% by weight of free magnesia, calculated at MgO.

23. The composition of claim 16 wherein said hydrocarbon conversion comprises hydrocarbon cracking in the substantial absence of added molecular hydrogen and a major amount, by weight, of said solid particles have diameters in the range of about 10 microns to about 250 microns.

24. The composition of claim 23 wherein at least one of said solid particles and discrete entities further comprise a minor, catalytically effective amount of at least one additional metal component capable of promoting the conversion of sulfur dioxide to sulfur trioxide.

25. The composition of claim 23 wherein said spinel comprises alkaline earth metal-containing spinel, and the atomic ratio of said first metal to said second metals is at least about 0.25.

26. The composition of claim 23 wherein said solid particles are separate from said discrete entities and the relative amounts of said solid particles and said discrete entities are in the range of about 80 parts of about 99 parts and about 1 part to about 20 parts by weight respectively.

27. The composition of claim 23 wherein said discrete entities contain at least about 90% by weight of said spinel.

28. The composition of claim 23 wherein said discrete entities further comprise about 0.1% to about 25% by weight of free magnesia, calculated as MgO.

29. The composition of claim 23 wherein said solid particles and said discrete entities are both present in combined particles.

* * * * *